United States Patent [19]

Cooke

[11] 4,434,903
[45] Mar. 6, 1984

[54] SAFETY CLOSURE AND CONTAINER

[76] Inventor: Carl W. Cooke, 8146 Lt. William Clark Rd., Parker, Colo. 80134

[21] Appl. No.: 443,486

[22] Filed: Nov. 22, 1982

[51] Int. Cl.³ .......................................... B65D 55/02
[52] U.S. Cl. ..................................... 215/222; 215/223
[58] Field of Search ................. 215/217, 222, 223, 224

[56] References Cited

U.S. PATENT DOCUMENTS

| | | |
|---|---|---|
| 1,898,342 | 2/1933 | Cuthbert . |
| 2,776,066 | 1/1957 | Thornton . |
| 3,072,276 | 1/1962 | Nichols . |
| 3,348,717 | 10/1967 | Treanor . |
| 3,360,147 | 12/1967 | Schaefer . |
| 3,399,796 | 9/1968 | Steiner . |
| 3,432,065 | 3/1969 | Bugla . |
| 3,435,975 | 4/1969 | Weigand . |
| 3,478,911 | 11/1969 | Hedgewick et al. . |
| 3,610,454 | 10/1971 | Malick . |
| 3,741,421 | 6/1973 | Witwer . |
| 3,790,014 | 2/1974 | Mucsi . |
| 3,952,899 | 4/1976 | Cooke ......................... 215/217 |
| 3,979,001 | 9/1976 | Bogart ........................ 215/217 |
| 4,032,028 | 6/1977 | Reiss et al. ................. 215/217 |
| 4,139,112 | 2/1979 | Cooke ......................... 215/217 |
| 4,397,397 | 8/1983 | Herr ........................... 215/222 |
| 4,399,920 | 8/1983 | Swartzbaugh et al. ....... 215/222 |

FOREIGN PATENT DOCUMENTS 261370 4/1927 United Kingdom .
796435 6/1958 United Kingdom .

*Primary Examiner*—George T. Hall
*Attorney, Agent, or Firm*—John E. Vanderburgh

[57] ABSTRACT

The combination of a multi-functional closure and container including an open neck portion. The closure includes a top wall, a resilient member carried by the top wall and a depending skirt portion for receiving the open neck portion of the container. Corresponding locking lugs are disposed about the inner wall of the cylindrical skirt portion of the closure and the outer wall of the neck portion of the container adapted to permit the closure to operate in a safety lock mode, a twist-on mode and a snap-on mode.

Each of the locking lugs of the container comprise a bayonet lug including an elongated axially extending member and a leading end member extending normal to the elongated portion. An enlarged area is provided on the leading end member and spaced from the elongated axially extending member to define an indent to provide the safety lock feature. In one embodiment the bayonet lug is provided with a trailing end member for cooperation with a corresponding lug on the closure providing the snap-on and twist-on mode of operation. In another embodiment, the leading end member is extended beyond the enlarged area of the bayonet lug to provide the snap-on and twist-on mode of operation in cooperation with a corresponding lug of the closure.

6 Claims, 8 Drawing Figures

SAFETY CLOSURE AND CONTAINER

BACKGROUND OF THE INVENTION

This invention relates to closures for containers and more particularly to closures and containers having a locking feature so that when the closure is sealingly engaged on a container the cap is locked thereon and can be removed only by special manipulation.

Safety closures are designed to lock into a container in such a fashion as to make their removal difficult, particularly for children. Safety closures are typically used in connection with containers for drugs, medicines, corrosive materials, and the like, which can cause serious injury if opened by children. For example, it is required that certain pharmaceuticals be dispensed from containers provided with safety closures in order to avoid such unintended opening.

In certain cases, however, such as, for example, when the closure and container are adapted for use with harmless substances, it is desirable to provide for the use of the closure in the conventional manner without the safety locking feature. In other cases, it may be desired to utilize a snap lock closure so that the closure is engaged in sealing relationship with the container by a simple downward thrust on the closure.

Several designs for safety closures are available, including single-piece and multi-piece designs. Examples of various designs for closures having a safety locking feature are to be found in U.S. Pat. No. 3,072,276 (Nichols), U.S. Pat. No. 3,360,147 (Shaeffer), and U.S. Pat. No. 2,776,006 (Thornton). A significant problem encountered with prior art safety closures is that of the shear strength of the locking elements. Thus, if the shear strength of the locking elements is too low, the closure can be removed by shearing or breaking away the locking element and this can occur even when manipulated by children. Consequently, it is highly preferred that the locking elements, particularly those on the closure, be integrally formed as part of the closure. Cooke, in U.S. Pat. No. 3,888,376 and U.S. Pat. No. 3,942,899, discloses an improved closure design employing a substantially continuous thread in which the locking means are integrally formed as part of the thread. In this manner, the probability of removing the closure without the proper manipulative steps by shearing the locking means is substantially reduced.

In many cases, however, it is preferred to utilize the closure in a more conventional fashion without the locking feature simply by engaging thread elements of the closure and container and simply torquing the cap into a sealing position or by a simple snap lock. One type of prior art device employs a two-sided closure in which conventional thread elements are provided on one side of the closure for engagement with corresponding thread elements on the inner surface of the mouth portion of the container and the other side provided with lugs which are engageble with corresponding locking elements on the outer surface of the neck of the container. These devices are expensive to manufacture and require the use of excessive amounts of materials in forming the two-sided closure.

SUMMARY OF THE INVENTION

The present invention is an improved closure and container where the closure can be utilized as a safety closure which, when in the sealing position, is locked on to the container, or which can be utilized as a snap-on closure or as a conventional twist-on closure without the safety locking feature.

In accordance with the invention, a container having a open neck portion is provided with a plurality of locking elements about the outer surface of the open neck portion and a closure having a cylindrical skirt portion adapted to receive the open neck portion of the container and wherein the skirt portion carries corresponding locking elements on the interior wall surface thereof for cooperation with the locking elements on the open neck portion of the container. The inner face of the closure is provided with resilient means for acting against the open neck portion of the container for urging the closure axially upwardly when the closure is in the sealing position, and for aiding in the sealing function of the closure.

The locking elements on the container comprise bayonet type lugs, each disposed on the neck portion of the container adjacent the mouth thereof and comprising and elongated, axially extending portion and a leading end portion extending normal to the elongated portion. The leading end portion of the bayonet lug is provided with an enlarged area spaced apart from the elongated portion to define an indent on the bayonet lug.

Each corresponding locking element on the closure is adapted to the ride over the leading end portion of its corresponding bayonet lug to provide a snap-on mode of operation or can be torqued on the leading end portion of the bayonet lug to provide a conventional twist-on mode of operation or can be received in the indent of the bayonet lug responsive to the upward urging of the resilient member on the closure to provide a safety lock mode of operation.

In one embodiment of the invention, the twist-on and snap lock features are provided, by extending the leading end of the bayonet lug beyond the enlarged portion so that the bayonet lug has essentially an inverted L-shape with the elongated axially extending portion comprising the base of the L.

In another embodiment of the invention, the twist-on and snap-on features are provided by providing a trailing end portion extending in a direction opposite the leading end portion so that the bayonet lug is essentially T-shaped.

While the invention will be described hereinafter in its preferred formed with the bayonet lug locking elements on the container, it should be apparent that the features of the invention can be achieved by simply reversing the locking elements and placing the bayonet lugs on the closure.

Other aspects and advantages of the invention will become apparent from the following detailed description of the preferred embodiments taken in conjunction with the accompanying drawings.

BRIEF DESCRIPTION OF THE DRAWINGS

FIG. 4 is a side view of the neck portion partially broken away and closure partially in section showing operation of the closure in the twist-on mode utilizing the bayonet lug of FIG. 2a.

FIG. 5 is a side view of the neck portion partially broken away and closure partially in section showing operation of the closure in the snap-on mode utilizing the bayonet lug of FIG. 2a.

DESCRIPTION OF THE PREFERRED EMBODIMENT

Figure 1:
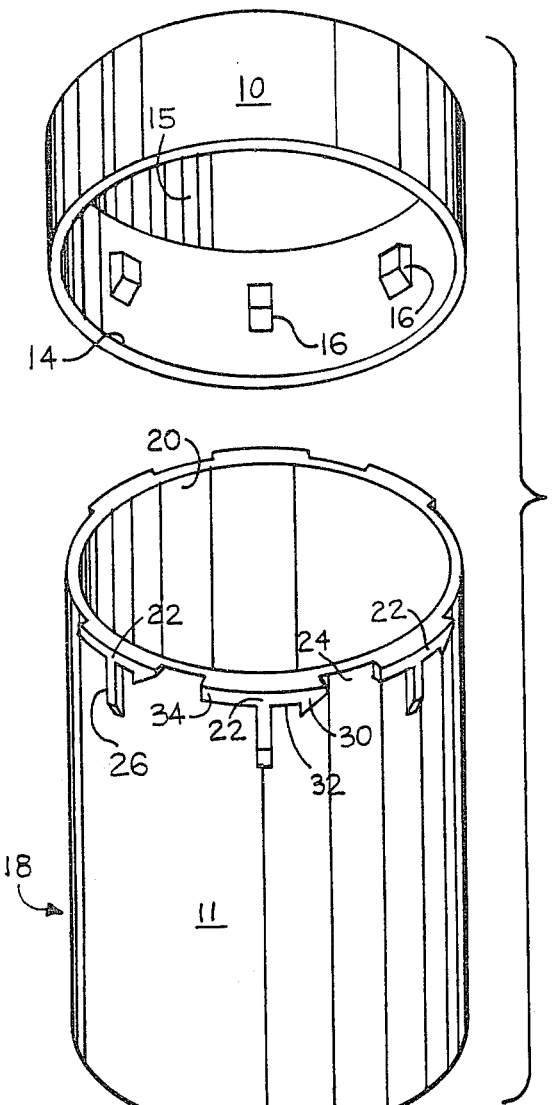
FIG. 1 is an isometric view of a closure and container showing a portion of the interior of the closure and the neck portion of the container illustrating the locking elements and having the bayonet lugs formed about the open neck portion of the container.

Referring now to the drawings, and particularly FIG. 1, there is shown a package structure comprising a container 11 and a closure 10, the closure having a top wall 12, and a depending skirt portion 14. The top wall 12 is provided with suitable resilient means such as an elastomeric liner 15. Locking lugs 16 are disposed about the inner wall surface of the depending skirt portion 14.

The container 11 has a neck portion 18 which terminates in an opening 20. The neck of the container is provided with a plurality of bayonet lugs 22, which are disposed about the neck portion 18 adjacent the opening 20 and which are spaced apart to define channels 24 therebetween.

Figure 2A:
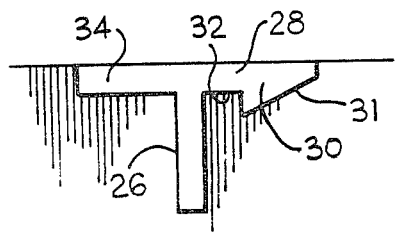
FIGS. 2a, and 2b are side views, in enlarged scale, of a portion of the neck portion of the container illustrating two embodiments of the bayonet lug.

As shown most clearly in FIG. 2a, each bayonet lug 22 comprises an elongated portion 26, which extends axially away from the opening 20 of the container 11 and a leading end portion 28, which is provided with an enlarged area 30, which defines a camming surface 31, and which is spaced on the leading end portion 28 away from the elongated portion 26 to define therebetween an indent 32. In the embodiment illustrated in FIG. 2a, a trailing end 34 extends normal to the elongated portion 26 in a direction opposite to the leading end 28. In the embodiment of the bayonet lug 22, illustrated in FIG. 2b, the trailing end member 34 is eliminated and the leading end member is extended beyond the enlarged area 30.

Figure 3A:
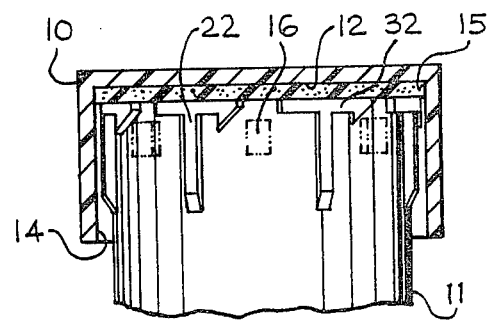
FIGS. 3a, 3b and 3c are sideviews, partially in section, illustrating the operation of the closure and container in the safety lock mode utilizing the bayonet lug embodiment of FIG. 2a as the closure receives the neck portion of the container and is drawn into sealing and locking position.
Figure 3B:
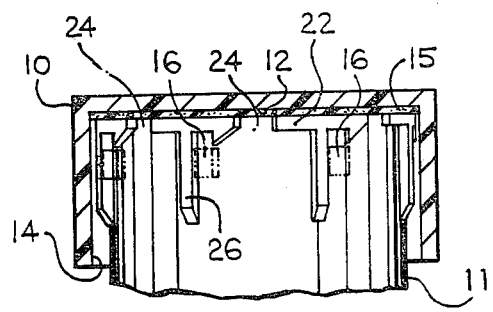
Figure 3C:
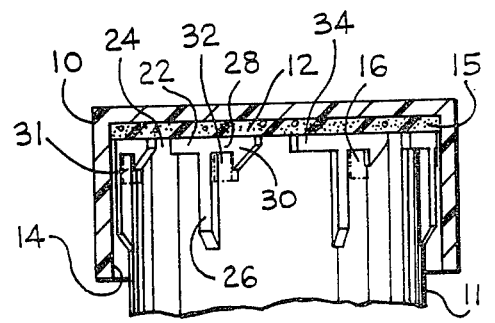

In accordance with the present invention, the closure can be operated in three modes of operation, i.e., as a safety lock closure, as a conventional twist-on closure, or as a snap-on closure. Referring to FIGS. 3a, 3b and 3c, the operation of the closure in the safety lock mode of operation is illustrated utilizing the bayonet lug 22, illustrated in FIG. 2a.

In operation the neck portion 18 of the container 11 is received within the depending skirt portion 14 of the closure 10. The lugs 16 of the closure are aligned with the channels 24 defined between the bayonet lugs 22. As the closure 10 is turned in clockwise direction, the lugs 16 are brought into contact with the camming surface 31 of the enlarged area 30, causing the closure to be drawn axially downwardly against the opening 20 of the container 11 and compressing the elastomeric liner 15 on the top wall 12 of the closure. Continued turning of the closure 10 brings the lugs 16 into alignment with corresponding indents 32 on the bayonet lugs 22 and the lugs are moved into the indent by the urging of the compressed elastomeric liner (FIG. 3c). In this position the closure is in a locked and sealing position on the neck portion 18 of the container 11. The closure 10 is removed by urging the closure axially downwardly to bring the lugs 16 out of the corresponding indents 32 and the closure is turned in a counterclockwise direction so that the lugs are brought back into alignment with the channels 24 so that the closure can be removed.

Figure 2B:
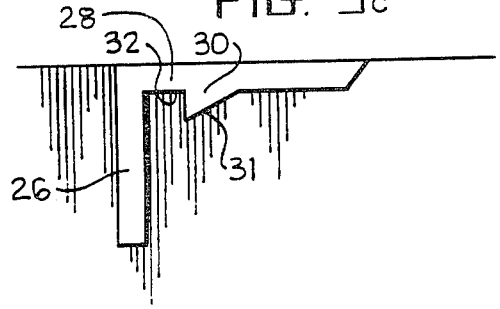

The closure 10 operates in the safety lock mode utilizing the embodiments of the bayonet lugs 22 illustrated in FIG. 2b in the same manner as described above for the embodiment of FIG. 2a.

Figure 4:
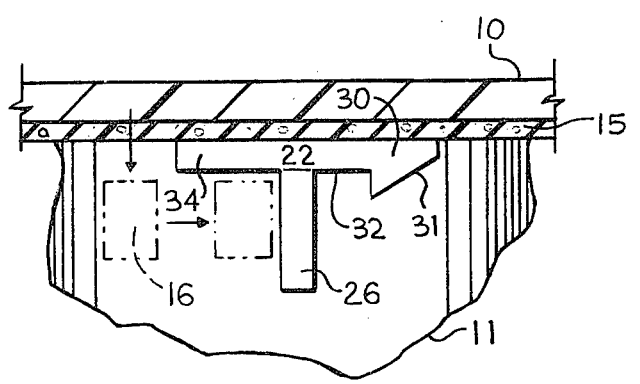

The use of the closure in the twist-on mode is best illustrated in FIG. 4 wherein the lugs 16 are placed in alignment with the corresponding channels 24 on the neck portion 18 of the container 11. The closure 10 is then pressed downward slightly and twisted in a counterclockwise direction until each of the lugs 16 are disposed beneath the trailing end member of the corresponding bayonet lug 22.

In the embodiment of the bayonet lug 22, illustrated in FIG. 2b, the leading end member 28 is extended beyond the enlarged area 30 so that the closure 10 can be operated in the twist-on mode by turning it in a clockwise direction so as to bring a lug 16 of the closure under the leading end 28 of a corresponding bayonet lug.

Figure 5:
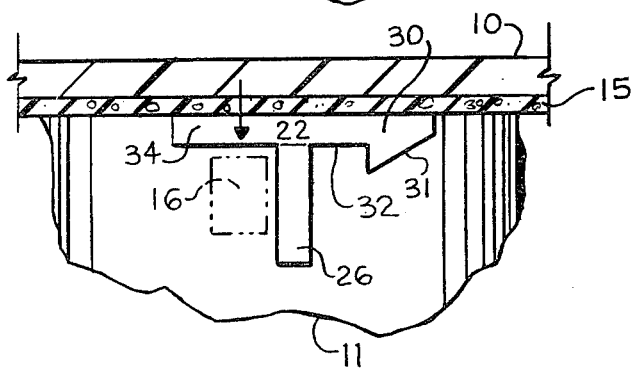

As illustrated in FIG. 5, the closure 10 operates in the snap-on mode by aligning the lugs 16 directly over the trailing end member 34 of the corresponding bayonet lugs 22 illustrated in FIG. 2a. Responsive to the downward urging of the closure 10, the lugs 16 are forced over the respective trailing end members 34 and snap into a locked position below the respective trailing end members. In the embodiment illustrated in FIG. 2b, the closure 10 is operated in the snap-on mode by aligning the lugs 16 over the extended portion of the leading end member 28.

Various embodiments and modifications of the invention have been described in the foregoing description and illustrated in the drawings. It will be understood, that minor changes may be made in the details of construction as well as in the combination and arrangement of parts without departing from the spirit and scope of the invention as claimed.

What is claimed is:

1. In the combination of a container having an open neck portion, a closure for said container comprising a top wall for sealing the mouth of said open neck portion and a cylindrical skirt portion adapted to receive the open neck portion of said container, resilient means carried on the inner wall of the top portion of said closure to urge said closure axially upwardly when said closure is drawn down into sealing position on the neck portion of said container and cooperating locking elements carried on the neck portion of said container and the inner wall of the skirt portion said portion, the improvement comprising:

the locking elements of said closure comprising lugs spaced about the periphery of the inner wall of the skirt portion;

bayonet lugs disposed about the open neck portion of said container, said bayonet lugs comprising an elongated portion adjacent the rim of the mouth of said container and extending axially on the neck portion and a leading end member extending normally to the elongated portion, the leading end member having an enlarged area spaced from the elongated portion of the bayonet lug to define an indented portion on the bayonet lug for receiving a lug of said closure when said closure is in the sealing position over the mouth of the open neck portion of said container.

2. The combination as defined in claim 1 wherein each bayonet lug further includes a trailing end member extending normally from said elongated portion in a direction opposite to the leading end member of the bayonet lug.

3. The combination as defined in claim 1 wherein the enlarged area of the leading end member defines a camming surface against which a corresponding lug on said closure rides for urging the closure axially downwardly responsive to the twisting of the closure.

4. The combination of claim 1 wherein the bayonet lugs of said container are spaced about the open end neck portion thereof so as to define therebetween a plurality of channels.

5. The combination of claim 1 wherein the trailing end member of the bayonet lugs and the corresponding lugs of said closure cooperate to provide a positive snap-on lock responsive to the axial downward movement of said closure when the corresponding lugs of said closure are aligned with the trailing ends of the corresponding bayonet lugs of said container.

6. The combination of claim 1 wherein the leading end member extends beyond the enlarged area and the leading end member cooperates with a corresponding lug of said closure to provide a positive snap-on lock responsive to the axial downward movement of said closure.

* * * * *